United States Patent
Best et al.

(10) Patent No.: US 6,659,193 B1
(45) Date of Patent: Dec. 9, 2003

(54) DEPTH ADJUSTMENT MECHANISM FOR FARM IMPLEMENTS

(75) Inventors: Donald T. Best, Saskatchewan (CA); Tony M. Matsalla, Saskatchewan (CA)

(73) Assignee: Morris Industries Ltd. (CA)

( * ) Notice: Subject to any disclaimer, the term of this patent is extended or adjusted under 35 U.S.C. 154(b) by 0 days.

(21) Appl. No.: 10/185,692

(22) Filed: Jun. 28, 2002

(51) Int. Cl.$^7$ .............................................. A01B 23/06
(52) U.S. Cl. ........................................ 172/566; 111/69
(58) Field of Search ................................ 172/566, 558, 172/561, 572; 111/192, 149, 157, 159, 163, 167, 18, 137, 69

(56) References Cited

U.S. PATENT DOCUMENTS

| | | | | |
|---|---|---|---|---|
| 1,791,462 | A | * 2/1931 | Bermel | 172/559 |
| 4,374,500 | A | * 2/1983 | Westerfield | 111/164 |
| 4,502,547 | A | * 3/1985 | MacIntyre | 172/606 |
| 5,081,942 | A | * 1/1992 | Clark et al. | 111/136 |
| 5,481,990 | A | * 1/1996 | Zacharias | 111/174 |
| 5,619,939 | A | * 4/1997 | Herman et al. | 111/163 |
| 6,024,179 | A | 2/2000 | Bourgault | |
| 6,148,747 | A | * 11/2000 | Deckler et al. | 111/137 |
| 6,260,632 | B1 | * 7/2001 | Bourgault et al. | 172/566 |
| 6,386,127 | B1 | * 5/2002 | Prairie et al. | 111/167 |

OTHER PUBLICATIONS

Morris Industries Ltd. Parts Manual—Mar. 2001—Cover Page, pp. 2.5 and 2.6.

* cited by examiner

Primary Examiner—Victor Batson
(74) Attorney, Agent, or Firm—Hovey Williams LLP

(57) ABSTRACT

An adjustment mechanism for use with farm implements or other equipment utilizes a series of alternating teeth and notches arranged in an arcuate pattern about an axis of adjusting movement on a movable member and a pair of arcuately spaced latching bars on a stationary member of the mechanism. The bars are individually shiftable into and out of engagement with the teeth and notches and are spaced apart such a distance that when either of the bars is in registration with a notch, the other bar is in registration with a tooth. Springs yieldably bias the bars toward the teeth and notches so that the bar aligned with a notch will snap down into the notch while the other bar resides in a standby position abutting the outer end of its tooth. When the seated bar is manually withdrawn from its notch, the movable member becomes unlatched and is free to be indexed one increment in either direction about the adjustment axis, whereupon the bar in the standby position snaps down into a notch brought under that bar, reestablishing a latched condition while the withdrawn bar becomes retained in its standby position by the outer end of its tooth. A double-acting lever having two fulcrum connections with the bars at their outer ends is successively raised and lowered about alternate ones of the fulcrum connections to manipulate the latching bars.

7 Claims, 6 Drawing Sheets

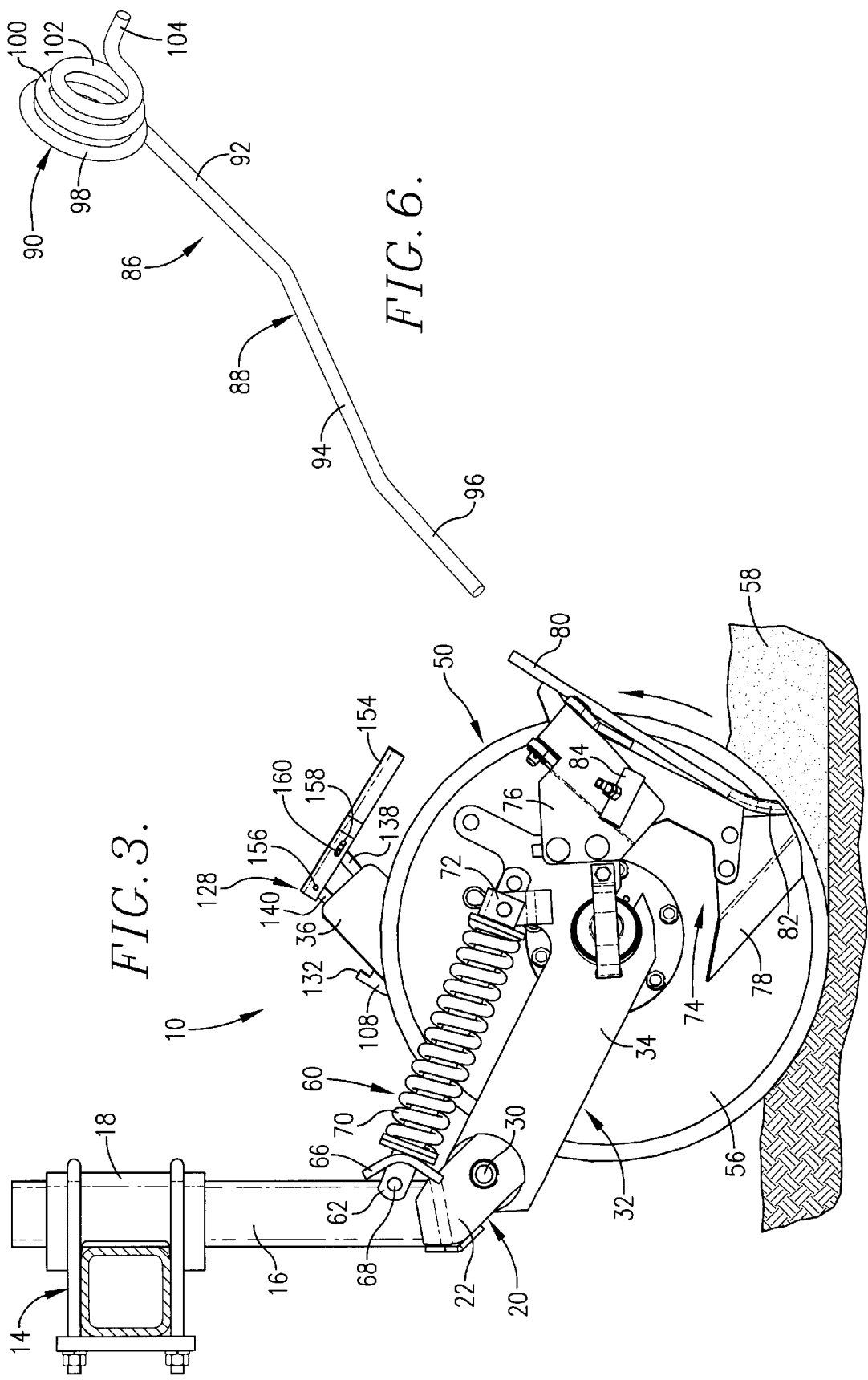

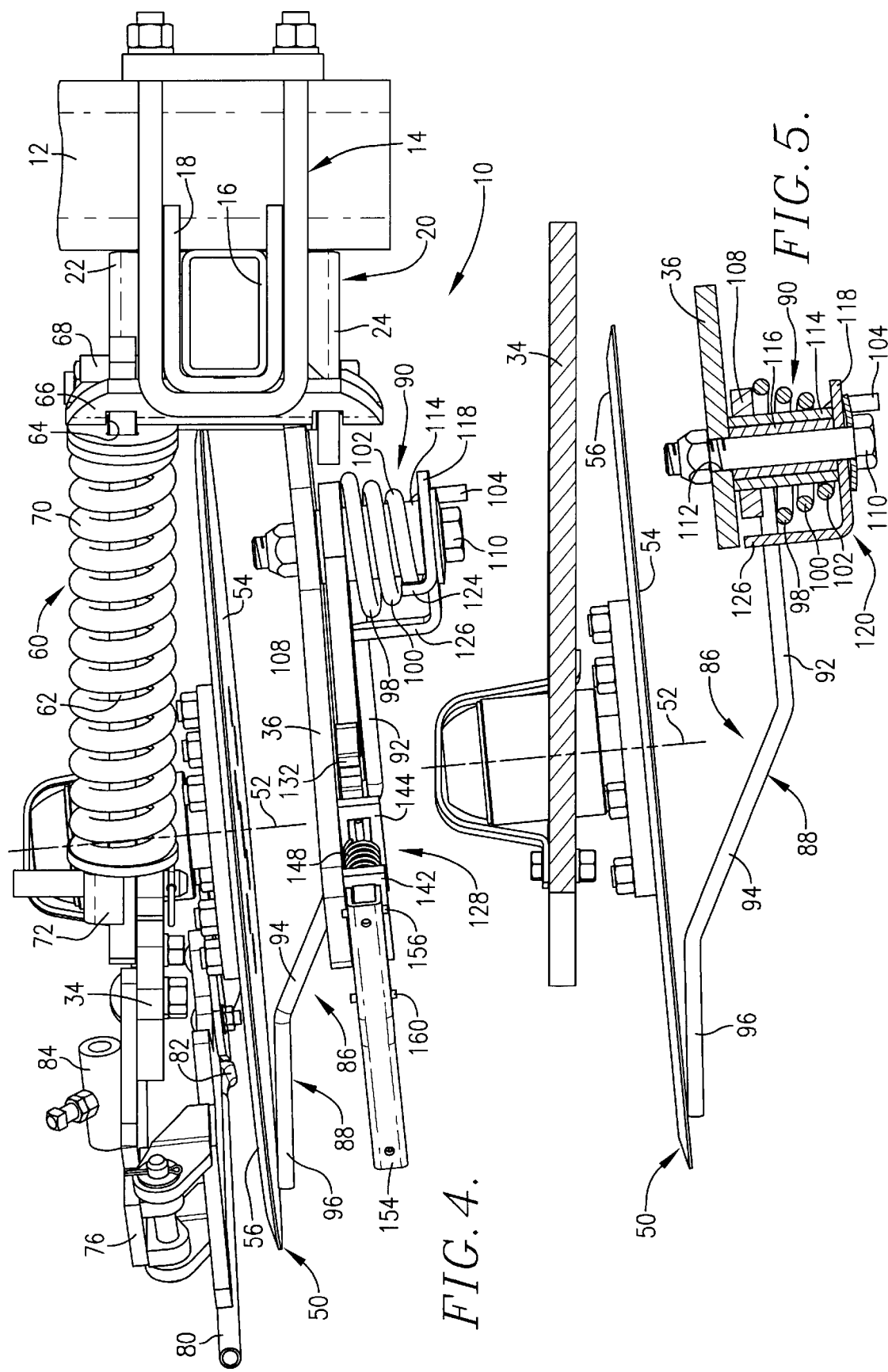

DEPTH ADJUSTMENT MECHANISM FOR FARM IMPLEMENTS

TECHNICAL FIELD

The present invention relates to farm equipment and, more particularly, to an adjustment mechanism having particular utility for quickly and easily adjusting the position of one part of a tool, such as a cleaning tine or gauge wheel of a coulter assembly, relative to another part of the tool, such as the coulter blade of the assembly. The invention is especially well-suited for large tillage or planting machines having many separate furrow opening units across the width of the machine, all of which must be uniformly adjusted.

BACKGROUND

Mechanisms and devices for adjusting and releasably retaining various components of farm equipment tools in selected positions of adjustment are well known in the art. However, many such mechanisms require the use of hand tools for making the adjustments, and many are rather tedious and time-consuming to use. Furthermore, many are not particularly precise.

Large, wide tillage and planting machines present particular challenges because they may be provided with fifty or more separate opener units that must all be maintained at the same setting. For example, if a slightly different running depth is desired for the coulter blades or other furrow opening devices of the machine, the gauge wheel of each and every opener on the machine must be adjusted before the machine can begin operations. Moreover, with conventional adjustment devices, it may be difficult to assure that each opener is set to the same depth.

SUMMARY OF THE INVENTION

The present invention provides an adjustment mechanism that can be operated quickly and easily without the need for hand tools. It also provides for relatively precise adjustments without sacrificing structural strength and sturdiness, which can be especially important in those applications where the device may be subjected to harsh conditions and heavy loading such as found in tillage and planting operations.

In a preferred embodiment of the invention a stationary part of the mechanism supports a movable part for pivotal adjustment about an axis of adjustment. A series of alternate teeth and notches on one of the parts are arranged in an arcuate pattern about the axis of adjustment, while a pair of arcuately spaced latching bars on the other part are adapted for independent movement into and out of engagement with the teeth and notches. The spacing between the latching bars is such that when either of the bars is in registration with a notch, the other bar is in registration with a tooth. Thus, by spring-loading both bars, one of them can be seated within a notch to retain the movable member in a selected position of adjustment while the other is maintained in a standby position abutting the outer end of a neighboring tooth. To change the position of the member by one increment, the seated bar is withdrawn from the notch and held against reinsertion, which releases the movable member. When the movable member is indexed one increment, the bar in the standby position snaps down into a notch now brought into registration with it and reestablishes a latched condition in the new position of adjustment. The previously latched bar can now be released to reside in a standby position spring-biased against the outer end of a tooth.

In an especially preferred embodiment, the teeth and notches are on the movable member, while the spring-loaded latching bars are on the stationary member. Further, a single actuating lever is connected to the two bars in such a manner as to facilitate withdrawal of a seated bar from a notch and to temporarily retain it in a withdrawn condition until the movable member has been indexed by one increment and the withdrawn bar is now retained in the standby position by the outer end of a tooth. The connection of the lever to the bars is in the nature of a pair of separate fulcrum connections that enable the lever to fulcrum about alternate ones of the bars in a pumping-like lift and lower action as the movable member is adjusted through successive increments.

The invention may be advantageously incorporated into a tillage or planting machine where many separate, individual opener assemblies across the width of the machine are provided. The movable member on each opener assembly may have a cleaning tine associated with it whose position relative to a coulter blade may need to be adjusted to provide optimum field operations. Alternatively, the movable member may have a gauge wheel associated with it that determines the depth of penetration of the coulter blade into the soil such that adjustment of the gauge wheel relative to the coulter blade correspondingly adjusts the depth of penetration. Furrow closing wheels and other structures requiring adjustment could alternatively be associated with the movable member.

DESCRIPTION OF THE DRAWINGS

FIG. 3 is a left side elevational view thereof;

FIG. 4 is a top plan view of the coulter assembly with the mounting bar of the implement frame fragmentarily shown;

FIG. 5 is a fragmentary cross-sectional view of the assembly taken along a horizontal cut plane passing through the pivot axis of an adjustable mounting member of the assembly;

FIG. 6 is an isometric view of the spring tine of the assembly;

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. It is to be appreciated that while the adjustment mechanism of the present invention is described and illustrated herein in connection with the adjustable cleaning tine of a coulter assembly, the mechanism can also be used advantageously with adjustable gauge wheels and other structures that might be associated with coulter assemblies or other devices.

Figure 1:
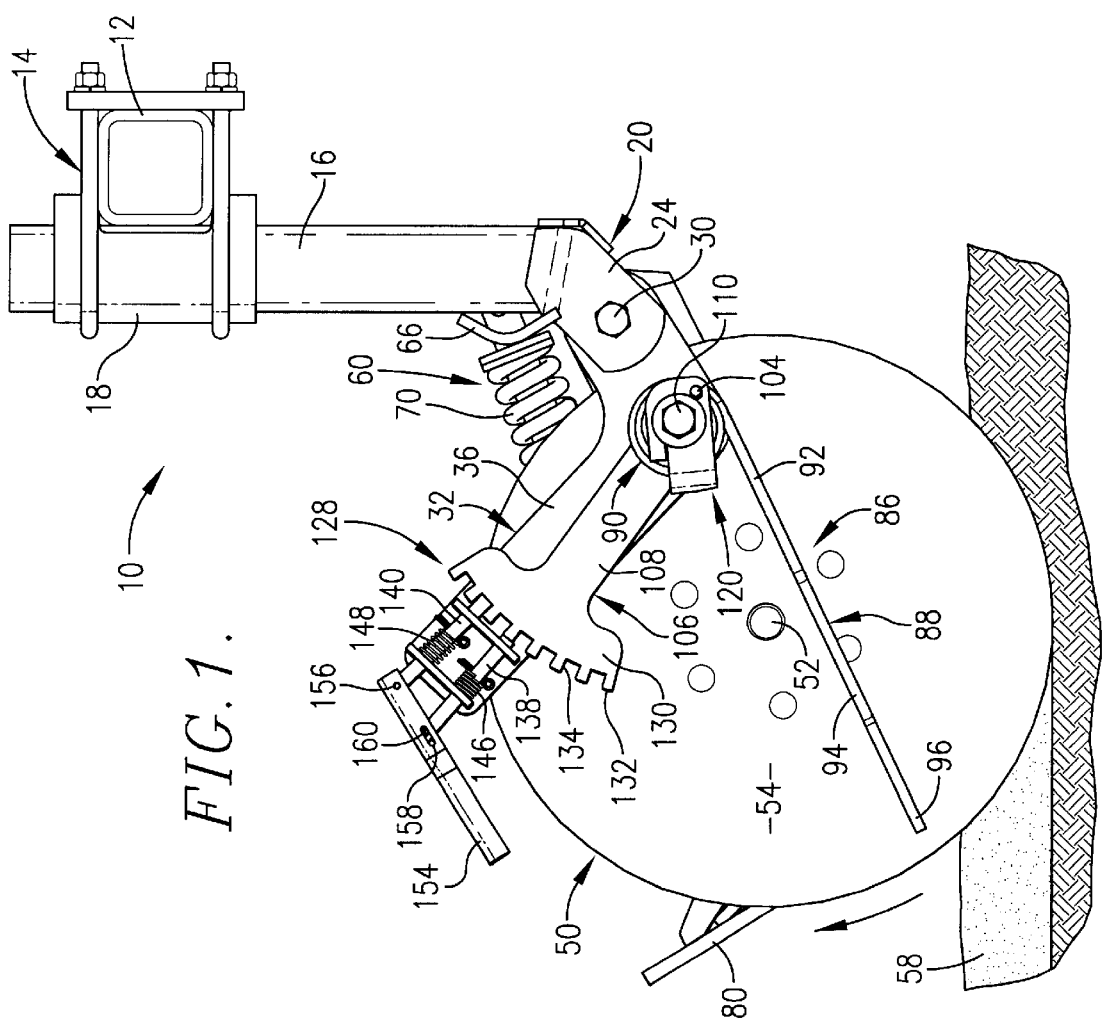
FIG. 1 is a right side elevational view of one exemplary embodiment of the present invention the particular apparatus chosen for exemplary purposes comprising a coulter assembly having an adjustable cleaning tine.

As shown particularly in FIGS. 1–4, a coulter assembly constructed in accordance with the principles of the present invention is broadly denoted by the numeral 10 and is adapted for attachment to the frame 12 of a farm implement (not shown). A U-bolt clamp assembly 14 accomplishes this function in the illustrated embodiment. Coulter assembly 10 in FIG. 1 is illustrated as moving from left to right during field operations, as well understood by those skilled in the art.

The coulter assembly 10 includes an upright tubular support 16 of generally rectangular cross-sectional configuration, such support 16 being adjustably received within and secured to a collar 18 that is in turn clamped to the frame 12 by the U-bolt clamp assembly 14. At its lower end, support 16 has a yoke 20 presented by a pair of laterally spaced apart, downwardly and rearwardly extending ears 22 and 24 (see also FIG. 8). Ears 22 and 24 are provided with a pair of corresponding holes 26 and 28 (FIG. 8) that are transversely horizontally aligned for the purpose of receiving a pivot bolt 30 defining a first transverse axis of swinging or pivoting movement as will hereinafter be further described.

Figure 8:
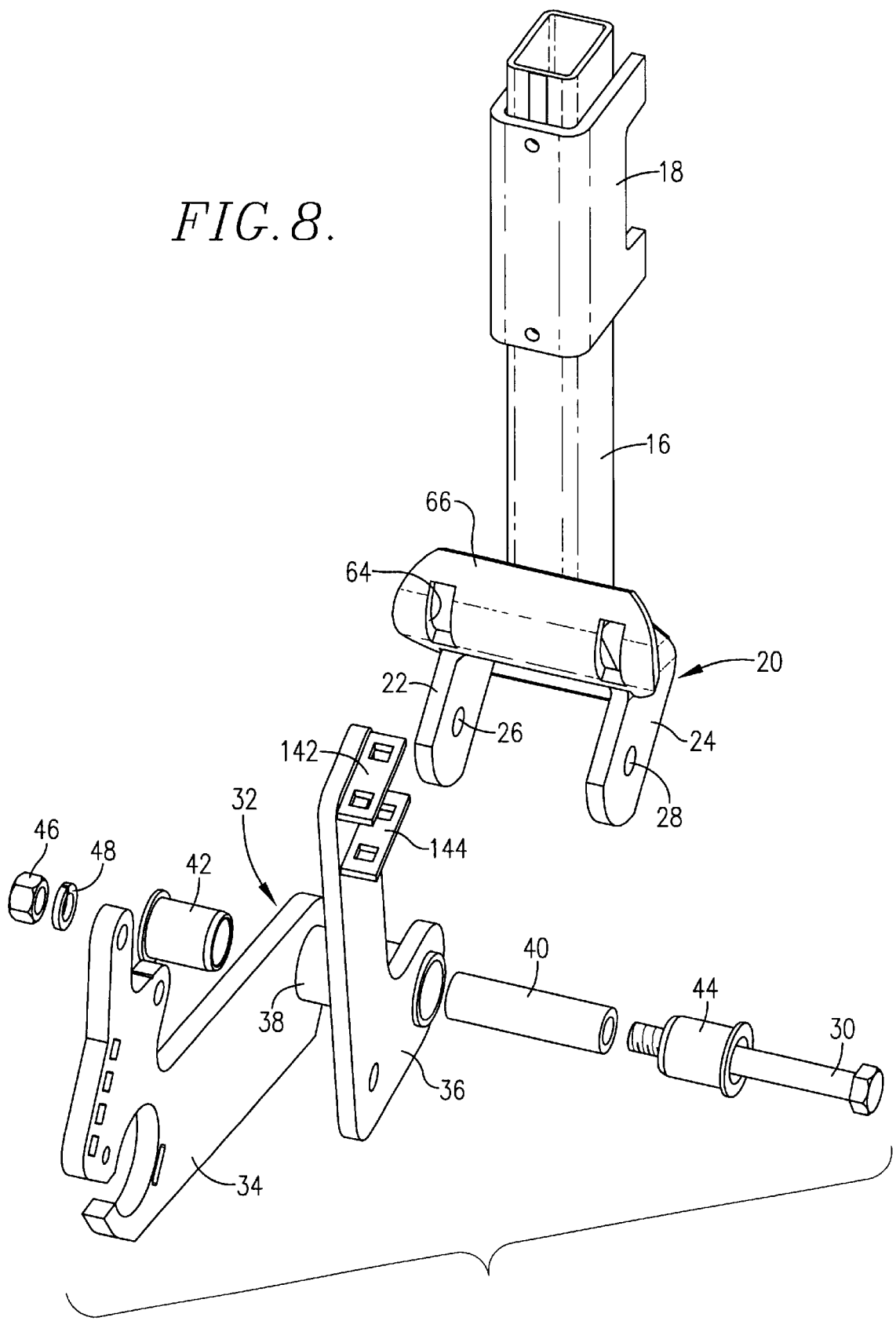
FIG. 8 is an exploded rear isometric view of certain components of the assembly.

Pivotally attached to yoke 20 via bolt 30 is a generally U-shaped carrier 32 (see FIG. 8 in particular) comprising a pair of laterally spaced arms 34 and 36 that are rigidly interconnected adjacent their forward ends by a transversely extending, cylindrical hub 38 welded at its opposite ends to the arms 34,36. As shown in FIG. 8, hub 38 houses a tubular spacer 40 on bolt 30, as well as a pair of bushings 42 and 44 on opposite sides of spacer 40. A nut 46 and lock washer 48 retain bolt 30 and carrier 32 on yoke 20.

Figure 2:
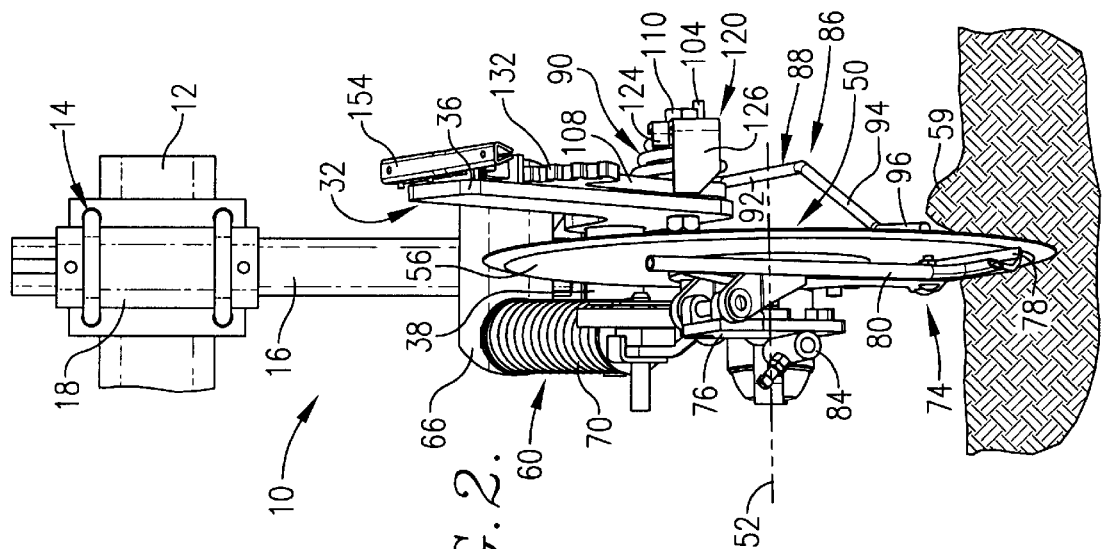
FIG. 2 is a rear elevational view thereof.

A generally flat, sharp-edged coulter blade 50 is rotatably supported on arm 34 of carrier 32. While arm 34 is disposed in generally perpendicular relationship to hub 38, the axis of rotation of coulter 50 is not parallel to the axis of up and down swinging movement of carrier 32 defined by bolt 30. Instead, the axis of rotation of coulter 50, denoted by the numeral 52 in FIGS. 4 and 5, is cocked forwardly so that it converges toward bolt 30 as arm 36 is approached. Thus, coulter 50 is correspondingly skewed at an oblique angle with respect to the forward path of travel of the implement, presenting a slightly leading or compression face 54 on one side and a trailing face 56 on the opposite side. Thus, as illustrated in FIGS. 1, 2 and 3, coulter 50 cuts through the soil during field operations and pushes the soil slightly to one side (FIG. 2) to prepare a shallow trench or furrow 58 into which seeds and/or fertilizer may be deposited. In the illustrated embodiment, the coulter assembly 10 selected for purposes of illustration may be termed a "right hand" assembly wherein coulter 50 is angled with compression face 54 on the right side so as to correspondingly produce a slight lift or lip of soil 59 (FIG. 2) as coulter 50 travels through the soil. It will be noted also that coulter 50 is tilted back slightly so the bottom extremity of coulter 50 is somewhat closer to arm 36 than the top extremity. This also results in axis 52 being slightly upwardly and rightwardly inclined as illustrated in FIG. 2.

Carrier 32 and coulter 50 are yieldably biased downwardly by a coil spring assembly 60. Such assembly 60 includes an elongated, fore-and-aft extending, rigid strap 62 that is anchored at its rear end to a rearward portion of arm 34 and at its forward end passes through a slot 64 (FIGS. 4 and 8) in an upturned abutment plate 66 that is rigidly affixed to support 16 just above yoke 20. A retainer pin 68 or the like (FIG. 4) prevents strap 62 from pulling back out of slot 64 and keeps carrier 32 and coulter 50 from dropping down beyond a predetermined limit of travel. Spring assembly 60 further includes a coiled compression spring 70 trapped between abutment plate 66 at the upper end and a shoulder 72 at the lower end to provide yieldable resistance to upward swinging of carrier 32 and coulter 50.

Attached to the rear of arm 34 is a scraper assembly broadly denoted by the numeral 74. Assembly 74 includes a mounting bracket 76 bolted or otherwise secured to arm 34, and a slightly inwardly curved scraper blade 78 secured to the lower extremity of bracket 76. Blade 78 is designed to contact trailing face 56 of coulter 50 generally within the second quadrant thereof as viewed in FIG. 3 for the purpose of scraping dirt and mud from trailing face 56 as it begins to lift up and out of furrow 58. The lowermost edge of blade 78 is angled upwardly and forwardly in a diagonal manner across the lower rear portion of trailing face 56.

A generally upright placement tube 80 is attached to and supported by the rear of bracket 76, such tube 80 having a lower discharge end 82 that curves slightly downwardly and rearwardly generally in the vicinity of scraper blade 78. Discharge end 82 of tube 80 is located somewhat above the bottom of furrow 58 and in transverse alignment with scraper blade 78 behind the latter so as to be in a protected position for discharging substances into furrow 58, such as seeds and/or fertilizer. The upper end of placement tube 80 is, of course, coupled with a source of supply of the materials being deposited in furrow 58. An upwardly and forwardly angled mounting sleeve 84 is also carried on bracket 76 but substantially outboard of tube 80 for the purpose of supporting an optional discharge tube (not shown) for other substances.

A special vibratory cleaning tine 86 is mounted on carrier 32 in a resilient and adjustable manner for cleaning dirt and mud from the compression face 54 of coulter 50 without catching and accumulating trash. Tine 86 is described and claimed in co-pending application Ser. No. 10/185,625 filed contemporaneously herewith and titled Fertilizer Coulter with Trash—Shedding, Vibratory Cleaning Tine.

As illustrated in FIG. 6, tine 86 includes two major portions, i.e., an elongated working leg portion 88 and a transverse relief spring coil portion 90. Working leg 88 includes an upper or forward segment 92 that extends at generally right angles to the axis of transverse coil 90. Leg 88 further includes an intermediate, inturned segment 94 extending at an oblique angle to the axis of coil 90, and a working tip segment 96 that projects rearwardly from intermediate segment 94 almost at the same angle as upper segment 92 but preferably inturned slightly with respect to the longitudinal axis of upper segment 92.

Figure 7:
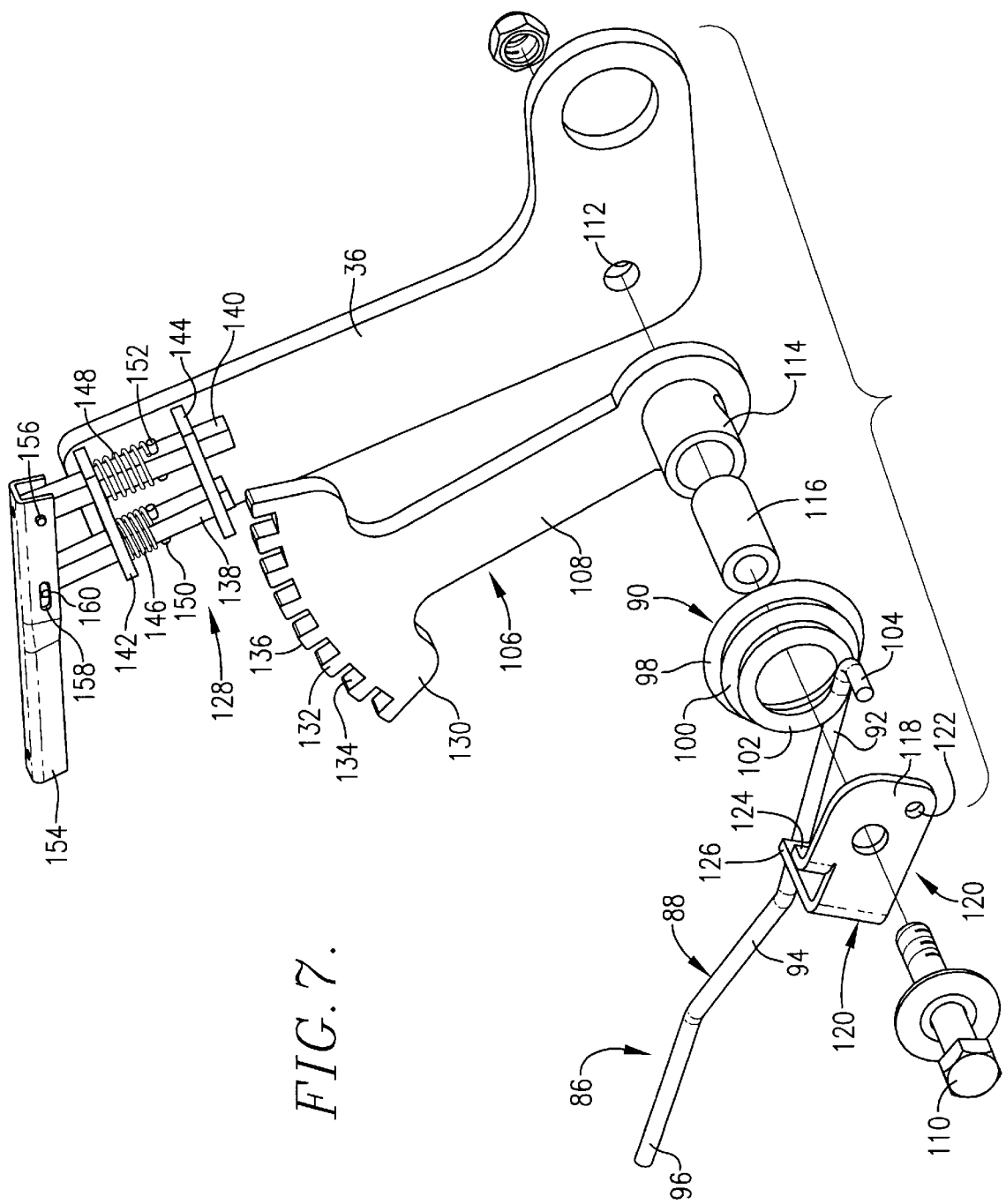
FIG. 7 is an exploded isometric view of certain components of the coulter assembly.

Tine 86 is mounted on carrier 32 by a special mount broadly denoted by the numeral 106. Mount 106 includes an upwardly and rearwardly angled arm 108 that is swingably attached to arm 36 of carrier 32 by a pivot bolt 110 which passes through a hole 112 in arm 36 as illustrated in FIG. 7, such bolt 110 defining a third axis of pivoting or rotational movement. Arm 108 has a cylindrical hub 114 rigidly affixed thereto such as by welding, the hub 114 projecting laterally outwardly from the outboard face of arm 108 and receiving a bushing 116 in concentric relationship to pivot both 110. Coil 90 of tine 86 encircles hub 114 and is trapped between the outboard face of arm 108 and a fore-and-aft extending leg 118 of a generally L-shaped keeper 120. Pivot both 110 serves to attach the entire assembly consisting of keeper 120, bushing 116, tine 86 and arm 108 to arm 36 of carrier 32.

Tine 86 is mounted on carrier 32 by a special mount broadly denoted by the numeral 106. Mount 106 includes an upwardly and rearwardly angled arm 108 that is swingably attached to arm 36 of carrier 32 by a pivot bolt 100 which passes through a hole 112 in arm 36 as illustrated in FIG. 7, such bolt 110 defining a third axis of pivoting or rotational movement. Arm 108 has a cylindrical hub 114 rigidly affixed thereto such as by welding, the hub 114 projecting laterally outwardly from the outboard face of arm 108 and receiving a bushing 116 in concentric relationship to pivot bolt 110. Coil 90 of tine 86 encircles hub 114 and is trapped between the outboard face of arm 108 and a fore-and-aft extending leg 118 of a generally L-shaped keeper 120. Pivot bolt 110 serves to attach the entire assembly consisting of keeper 120, bushing 116, tine 86 and arm 108 to arm 36 of carrier 32.

Tine 86 is oriented on hub 114 of mount 106 in such a manner that working leg 88 is closest to arm 108, with coil 90 progressively decreasing in diameter as keeper 120 is approached. In a preferred embodiment, the largest convolution 98 is significantly larger in diameter than hub 114 so that convolution 98 does not engage the exterior surface of hub 114. Likewise, convolution 100 is, for the most part, sufficiently large in diameter that the interior surface of convolution 100 does not engage the exterior of hub 114. Convolution 102, on the other hand, has substantially the same internal diameter as the exterior diameter of hub 114 such that convolution 102 physically engages the exterior of hub 114 over a complete 360° of wrap. Tang 104 on convolution 102 projects through and is received within a retaining hole 122 in leg 118 of keeper 120. A first inturned protrusion 124 on leg 118 bears against smallest convolution 102 to help retain the latter in place on hub 114, while a second inturned leg 126 of keeper 120 overlies upper segment 92 of working leg 88 and underlies the bottom edge of mounting arm 108 as illustrated, for example, in FIG. 2.

Mount 106 and tine 86 are selectively adjustable about the axis of bolt 110 so as to permit adjustment of the angle of working tine leg 88 relative to the ground. As illustrated in FIG. 1, for example, working tine leg 88 extends generally downwardly and rearwardly diagonally across outer face 54 of coulter 50 just below axis 52, but that angle can be adjusted as may be necessary or appropriate considering the running depth of coulter 50 and/or the trash flow in the vicinity of tine 86. Generally speaking, it has been found beneficial to position the working tip segment 96 of tine 86 just slightly above the surface of the ground when coulter 50 is at operating depth. Moreover, it has been found that, in some conditions, tine 86 may more readily shed trash as working leg 88 is less inclined and more horizontally disposed. Mechanism for rendering tine 86 selectively adjustable in this respect is broadly denoted by the numeral 128.

Mechanism 128 includes cooperating, interengageable structure on arm 36 of carrier 32 and arm 108 of mount 106. Arm 36 comprises a stationary member, while arm 108 comprises a movable member. More specifically, arm 108 at its upper and rearmost end includes an enlarged, generally arcuately configured locking segment 130 provided with a series of side-by-side, alternate teeth 132 and notches 134. In the illustrated embodiment, a total of eight teeth 132 are provided, along with seven notches 134 interspersed between the teeth. The radially outermost faces 136 of teeth 132 are generally flat or at most slightly convexly radiused, while notches 134 are slightly tapered so as to widen progressively and by a small amount as the deep end of each notch is approached. Teeth 132 are substantially the same size as notches 134.

The other part of adjustment mechanism 128, i.e., the structure on arm 36 of carrier 32, includes structure for selectively engaging teeth 132 and notches 134 for the purpose of holding mount arm 108 in a selected position about the axis of pivot bolt 110. Such structure includes a pair of generally upright latching bars 138 and 140 that are each sized and shaped to be easily received within a selected one of the notches 134. Latching bars 138 and 140 are spaced apart on the arc of swinging travel of locking segment 130 a distance equaling the combined width of one notch and one tooth and, more particularly, a center-to-center distance equal to three times the center-to-center distance between a notch and an adjacent tooth. Thus, as illustrated in FIG. 1, for example, when the latching bar 138 is aligned with a tooth 132, the latching bar 140 is aligned with a notch 134 on the other side of the next adjacent tooth.

The terms "teeth", "notches", and "bars" as used in this description and the claims are intended to be interpreted broadly rather than in a limiting sense. Thus, the term "teeth" or "tooth" is intended to encompass a wide variety of projections and/or surfaces, while the term "notches" or "notch" is intended to encompass a wide variety of different depressions, indentations, holes, recesses and/or cavities. Likewise, the term "bars" or "bar" is intended to encompass a wide variety of different movable pins, shafts, projections, and/or members.

A pair of generally vertically spaced, superimposed guide plates 142 and 144 slidably receive the two latching bars 138,140 for individual reciprocation thereof toward and away from locking segment 130, and latching bars 138,140 are provided with coil compression springs 146 and 148 respectively for yieldably biasing the bars downwardly toward teeth 132 and notches 134. Cross pins 150 and 152 in latching bars 138 and 140 respectively trap springs 146 and 148 against the underside of upper guide plate 142 to carry out this function.

The latching bars 138 and 140 pass upwardly through and beyond upper guide plate 142 and are operably coupled at that location with a generally fore-and-aft extending operating handle or lever 154. The forward end of lever of 154 is pivotally connected to the upper end of latching bar 140 via a fulcrum pivot 156, while the mid-part of lever 154 is operably coupled with the upper end of latching bar 138 via a fore-and-aft slot 158 in lever 154 and a transverse fulcrum pin 160 on bar 138. The distal end of lever 154 thus functions as a gripping portion to facilitate manual actuation of lever 154.

OPERATION

Figure 10:
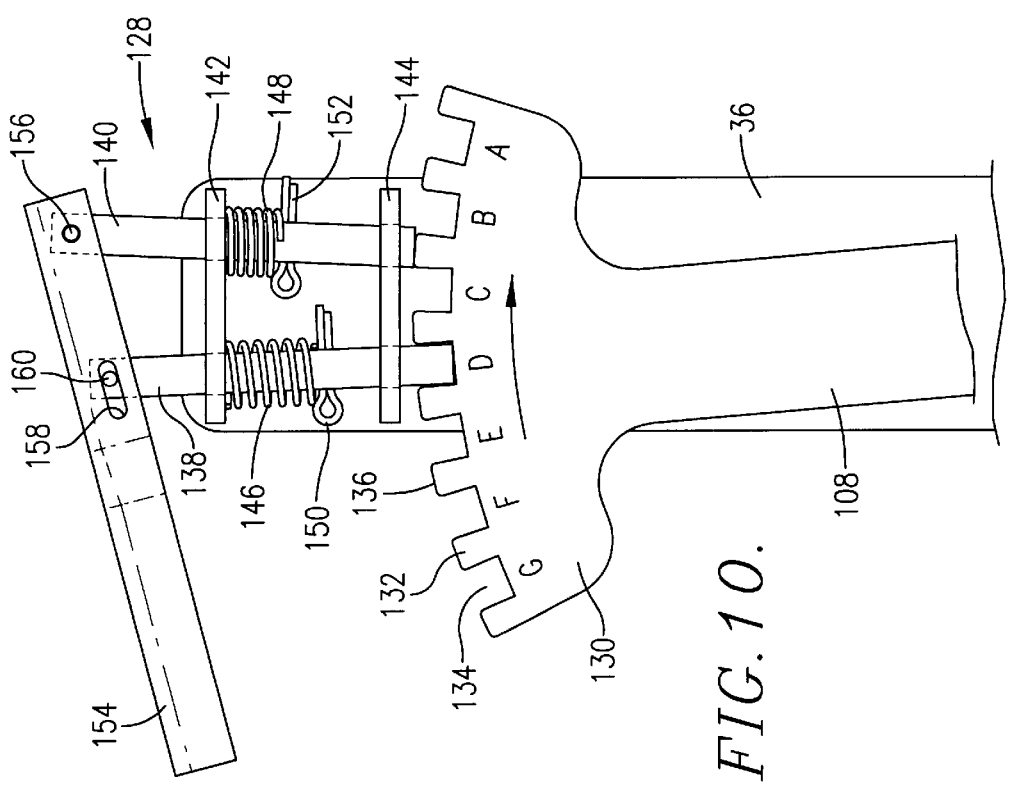
FIG. 10 is a fragmentary side elevational similar to FIG. 9 but illustrating the adjustable indexed one increment from its position in FIG. 9.
Figure 9:
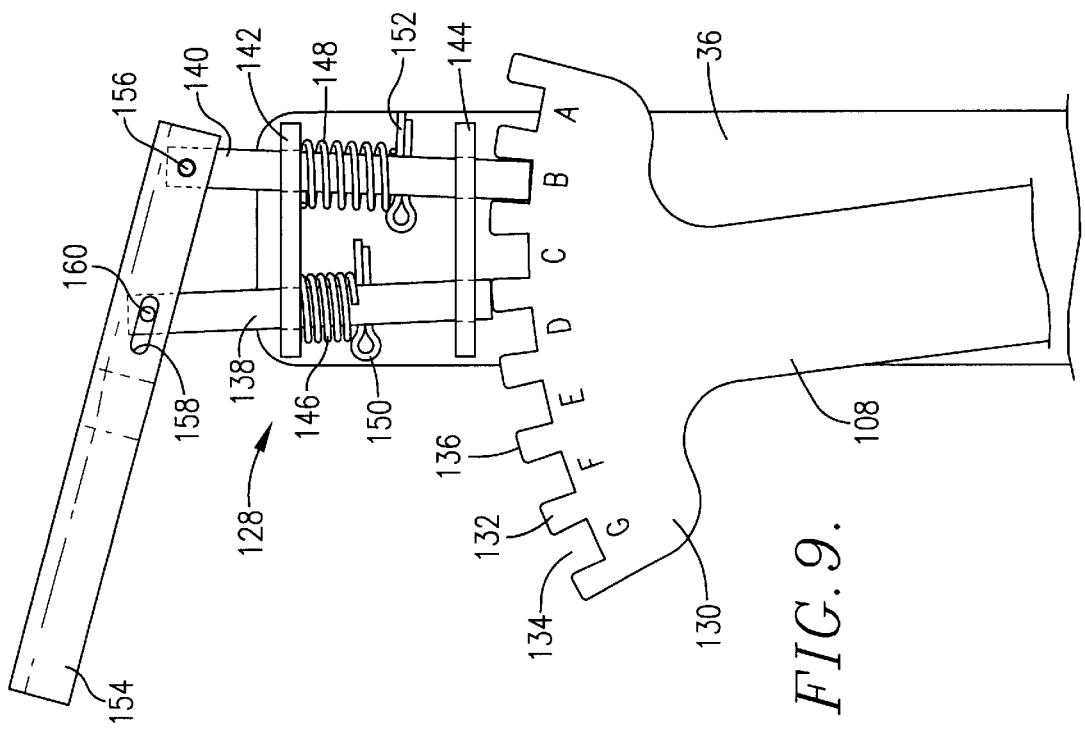
FIG. 9 is a fragmentary side elevational view of the adjustment mechanism associated with the coulter assembly.

FIGS. 9 and 10 illustrate the manner of use and operation of adjustment mechanism 128. As illustrated therein, the notches 134 are preferably labeled with suitable indicia such as alphabet letters "A" through "G" to facilitate quick recognition of the particular setting that has been selected for arm 108 relative to arm 36. Although not shown in the drawings, it is to be understood that a suitable reference point or indicator could be provided on the stationary arm 36 in close association with the notches A–G so that the setting can be visually determined by noting which of the notches A–G is in close proximity to the indicator. For example, lower guide plate 144 could be provided with a downturned, overhanging lip (not shown) disposed outboard of teeth 132 and overlying the teeth and portions of the indicia A–G. A cut-out or window (not shown) could be provided in such lip in registration with the indicia A–G for indicating the selected setting depending upon which alphabet letter is exposed by the window. This type of arrangement would be particularly beneficial on large implements where many separate tools or assemblies need to be uniformly adjusted.

FIG. 9 illustrates arm 108 latched by latching bar 140, which is seated within notch B. On the other hand, bar 138 is maintained in a standby position abutting the outer end of the tooth between notches C and D. Spring 146 associated with bar 138 is in a compressed condition, and the rear end of lever 154 is in a raised position.

In order to adjust arm 108 one increment in a clockwise direction relative to arm 36, lever 154 is grasped and pushed down, causing it to fulcrum about pin 160, which raises the forward end of lever 154 and withdraws bar 140 from notch B against the resistance of spring 148. With lever 154 held down in this condition, both bars 138 and 140 are out of the notches, which has the effect of releasing or unlatching arm 108. Thus, arm 108 may then be grasped with the user's other hand and indexed one increment in a clockwise direction viewing FIG. 10. When notch D comes into registration with bar 138, spring 146 automatically snaps bar 138 down into notch D, re-establishing a latched condition of arm 108 as shown in FIG. 10. At the same time, the tooth between notches B and C has come into registration with bar 140 such that the outer end of such tooth now functions to retain bar 140 in its standby position as illustrated in FIG. 10.

If an additional increment of adjustment is desired, the rear end of lever 154 is then raised so that the front end fulcrums about pivot 156 and bar 138 becomes withdrawn and unseated from notch D. With arm 108 thus unlatched, arm 108 may be indexed one additional increment in clockwise direction until notch C comes under bar 140, whereupon spring 148 will snap bar 140 down into seated relationship within notch C. Because the outer end of the tooth between notches D and E comes under the withdrawn bar 138 at this time, bar 38 becomes maintained in its standby position yieldably abutting the outer end of such notch.

It will thus be seen that in carrying out the adjustment action, lever 154 alternately fulcrums about different ones of the bars 138 and 140 in successive lifting and lowering motions. If a significant amount of adjustment is desired, several repeated operations of lever 154 will be carried out, the resulting motion somewhat resembling the pumping action that occurs when operating the pump handle of a manual water pump.

It should also be apparent that by using a pair of latching bars instead of only one, a finer and more precise adjustment can be achieved. If only a single latching bar is used, the increments of adjustment correspond to the distance between adjacent notches. However, with a pair of bars, mutually spaced so that when one registers with a notch the other registers with a tooth, the increment of adjustment equals one-half the distance between adjacent notches. Yet, this finer adjustment has been achieved without reducing the size of the teeth, which might correspondingly reduce the structural reliability of the device. With the present invention, increased precision is obtained without sacrificing structural strength and sturdiness.

With respect to the overall operation of coulter assembly 10 and cleaning tine 86, it will be appreciated that as coulter 50 rotates through the soil in its furrow-forming action, clumps of dirt tend to adhere to trailing portions thereof as they move up and out of furrow 58. However, scraper blade 78 continuously scrapes those materials from the trailing face 56 of coulter 50, while tine 86 performs the same function on compression face 54. While scraper blade 78 travels in the "shadow" or lee of coulter 50 and is thus essentially shielded from encounters with trash materials, tine 86 is not so protected and is instead fully exposed to trash materials that would tend to catch on working leg 88 thereof and accumulate. However, due in part to the resilient mounting of working leg 88 through spring coil 90, working leg 88 is constantly undergoing a vigorous vibratory action in a variety of planes that helps it shake free of trash materials that would otherwise cling and build up on the tine. Such action is caused in part by impacts with the trash materials themselves but, in addition, by the clumps of dirt adhering to the face 54 of coulter 50 and passing under the working tip 96 that otherwise always remains in metal-to-metal contact with face 54. Such encounters of tip 96 with dirt clumps has the tendency not only to flip the tine upwardly, but also to snap it outwardly away from the face of the coulter. Thus, the tine is continuously undergoing a lift and drop action as well as an in and out flexing, all of which has the effect of shaking otherwise clinging trash materials off the tine and on to the ground. Without build up of trash on the tine, tip 96 is free to maintain metal-to-contact with face 54 to provide improved cleaning action without trash build-up.

Due to the special design of coil 90, the spring action of working leg 88 is much more lively than would otherwise be the case. In this respect it will be noted that the two largest convolutions 98 and 100 of coil 90 are essentially open and unstressed when working leg 88 is under no load. Thus, not only is the inherent resiliency of operating leg 88 available over its operating length from hub 114 to working tip 96, but also the length of wire presented by the unconstricted convolutions 98 and 100 is available to provide a resilient action. Thus, as working leg 88 is forced upwardly out of its nominal position, the two largest convolutions 98 and 100 have considerable space to constrict or contract in a tightening action around hub 114, thus storing up energy for a snap return of working leg 88 back toward its nominal or equilibrium position once the loading has been removed. Moreover, the open and unloaded condition of the two largest convolutions 98 and 100 allows them to twist and cant inwardly and outwardly as need be to provide for an extensive range of travel of operating leg 88 toward and away from compression face 54 when a transverse loading is experienced by the working tip 96. Again, this greater range of motion and resilience than would be provided if convolutions 98, 100 and 102 were all tightly wrapped around hub 114 provides a more animated action on the part of tine 86 to resist the accumulation of trash materials.

Furthermore, this lively action of tine 86 can be obtained at any adjusted position thereof relative to coulter 50 and the ground surface. Regardless of the selected position of mount 106 about the axis of pivot bolt 110, the performance of coil 90 is unaffected. It will be observed in this respect that coil 90 does not in any way tighten or loosen on hub 114 as mount arm 108 is adjusted. Instead, tine 86, including both working leg 88 and coil 90, moves as a unit with mount 106 in the direction of adjustment. In some cases it may be desirable to have working leg 88 more or less angled than illustrated in FIG. 1, but in either case the performance of coil 90 remains the same to provide superior vibratory action.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

We claim:

1. In a farm implement having a ground-engaging tool including a coulter assembly provided with a coulter blade, a stationary member, and a movable member that is adjustable relative to the stationary member about an axis of adjustment, the improvement comprising:

a plurality of alternating teeth and notches on one of said members arranged in a generally arcuate series concentric with said axis of adjustment;

a pair of latching bars on the other of said members, said bars being mutually spaced arcuately about said axis of adjustment and disposed for movement independently of one another into and out of engagement with said series of teeth and notches, said spacing of the bars being such that when either of the bars is in registration with a notch the other bar is in registration with a tooth such that the movable member may be releasably latched in any of a number of selectable positions about said axis by placing a chosen bar in an appropriate notch; and a cleaning tine associated with said movable member for cleaning said coulter blade, said tine being positioned generally transverse to said axis of adjustment and mounted on said movable member for adjustment relative to said coulter blade about said axis of adjustment, said movable member having a cylindrical hub affixed thereto and projecting laterally therefrom, said tine including an elongated working leg portion and a transverse relief spring coil portion having a plurality of side-by-side concentric convolutions, said relief spring coil portion being wrapped around said hub.

2. In a farm implement as claimed in claim 1, further comprising a generally L-shaped keeper for said tine secured to an outer end of the hub, said keeper having a first leg extending across said outer end of the hub generally transverse to said axis of adjustment and having a retaining hole, said convolutions of the relief spring coil portion including an outermost convolution having an outturned tang received within said retaining hole, said keeper further having a second inturned leg extending generally parallel to said axis of adjustment, said second leg of the keeper overlying said working leg portion of the tine and underlying a bottom edge of said movable member.

3. In a farm implement as claimed in claim 2, said first leg of the keeper further having an inturned protrusion overlying and bearing against said outermost convolution.

4. In a farm implement as claimed in claim 2, said first leg of the keeper further having an opening disposed concentrically with respect to said axis of adjustment, said keeper being secured to said hub by a pivot bolt passing through said opening and through said hub.

5. In a farm implement as claimed in claim 2, said convolutions of the relief spring coil portion progressively decreasing in diameter as said outermost convolution is approached, the convolution that is closest to said working leg portion being the largest of said convolutions and having an internal diameter that is larger than the exterior diameter of said hub to avoid engaging the hub, said outermost convolution being the smallest of said convolutions and having an internal diameter that is substantially equal to the exterior diameter of the hub for gripping the hub.

6. In a farm implement having a ground-engaging tool including a coulter assembly provided with a coulter blade, a stationary member, and a movable member that is adjustable relative to the stationary member about an axis of adjustment, the improvement comprising:

a plurality of alternating teeth and notches on one of said members arranged in a generally arcuate series concentric with said axis of adjustment;

a pair of latching bars on the other of said members, said bars being mutually spaced arcuately about said axis of adjustment and disposed for movement independently of one another into and out of engagement with said series of teeth and notches, said spacing of the bars being such that when either of the bars is in registration with a notch the other bar is in registration with a tooth such that the movable member may be releasably latched in any of a number of selectable positions about said axis by placing a chosen bar in an appropriate notch; and a cleaning tine associated with said movable member for cleaning said coulter blade, said tine being positioned generally transverse to said axis of adjustment and mounted on said movable member for adjustment relative to said coulter blade about said axis of adjustment, further comprising a handle operably coupled with the bars for use in manually withdrawing the bars out of the notches, said handle comprising a lever having a fulcrum connection with each of said bars, respectively, whereby the lever may be turned about alternate ones of said fulcrums and in alternate directions to operate the bars.

7. In a farm implement as claimed in claim 6, each of said bars having a spring operably coupled therewith for yieldably biasing the bar toward engagement with the teeth and notches.

* * * * *